US006786951B2

(12) United States Patent
He et al.

(10) Patent No.: US 6,786,951 B2
(45) Date of Patent: Sep. 7, 2004

(54) PROCESS FOR THE PRODUCTION OF HIGH SURFACE AREA TANTALUM AND/OR NIOBIUM POWDERS

(75) Inventors: Jilin He, Shizuishan (CN); Luntao Pan, Shizuishan (CN); Ningfeng Yuan, Shizuishan (CN); Xiaoli Wen, Shizuishan (CN); Xingbang Li, Shizuishan (CN)

(73) Assignee: Ningxia Orient Tantalum Industry Co., Ltd., Shizuishan (CN)

( * ) Notice: Subject to any disclaimer, the term of this patent is extended or adjusted under 35 U.S.C. 154(b) by 25 days.

(21) Appl. No.: 10/262,229

(22) Filed: Sep. 30, 2002

(65) Prior Publication Data

US 2003/0110890 A1 Jun. 19, 2003

(30) Foreign Application Priority Data

Sep. 29, 2001 (CN) ........................................ 01135325 A

(51) Int. Cl.$^7$ ................................................ B22F 9/20
(52) U.S. Cl. ........................................ 75/365; 75/369
(58) Field of Search .................................... 75/365, 369

(56) References Cited

U.S. PATENT DOCUMENTS

| 3,012,877 A | 12/1961 | Foss et al. | ........... 75/84.4 |
|---|---|---|---|
| 4,009,007 A | * 2/1977 | Fry | ........... 75/230 |
| 4,445,931 A | * 5/1984 | Worthington | ........... 75/343 |
| 4,508,563 A | * 4/1985 | Bernard et al. | ........... 419/29 |
| 4,512,805 A | * 4/1985 | Albrecht et al. | ........... 75/244 |
| 4,582,530 A | * 4/1986 | Heinrich et al. | ........... 420/424 |
| 6,136,062 A | 10/2000 | Löffelholz et al. | ........... 75/369 |
| 6,171,363 B1 | * 1/2001 | Shekhter et al. | ........... 75/369 |
| 2003/0070509 A1 | * 4/2003 | Osako et al. | ........... 75/343 |

FOREIGN PATENT DOCUMENTS

WO    WO 91/18121    11/1991    ........... C22B/34/20

* cited by examiner

*Primary Examiner*—George Wyszomierski
(74) *Attorney, Agent, or Firm*—Fish & Neave; Jane T. Gunnison; Connie Wong

(57) ABSTRACT

A process of the production of high surface area tantalum and/or niobium powders via the reduction of the corresponding tantalum and/or niobium oxides is disclosed, wherein the reduction is carried out by reacting the tantalum and/or niobium oxides with at least one metal halide selected form the group consisting of halides of Mg, Ca, Sr, Ba and Ce, and an alkali metal at elevation temperature so as to form the tantalum and/or niobium powders. The process of the present invention has the advantages of: simple operation, the tantalum and/or niobium powders obtained have high surface area, high purity, good flowability, therefore are particularly suitable for manufacturing electrolytic capacitors.

16 Claims, 2 Drawing Sheets

PROCESS FOR THE PRODUCTION OF HIGH SURFACE AREA TANTALUM AND/OR NIOBIUM POWDERS

CROSS REFERENCE TO RELATED APPLICATION

Under 35 U.S.C. § 119, this application claims the benefit of copending Chinese Application No. CN 01135325.2, filed Sep. 29, 2001. This application incorporates by reference the disclosure of CN 01 135325.2 in its entirety.

TECHNICAL FIELD OF INVENTION

The present invention relates to a process for the production of high surface area tantalum and/or niobium powders.

BACKGROUND OF THE INVENTION

An important application of tantalum and niobium powders is to be used in manufacturing the electrolytic capacitors. The manufacture of tantalum or niobium solid electrolytic capacitor is typically comprised of: compressing the tantalum or niobium powder to form a pellet with an embedded tantalum or niobium lead wire, sintering the pellet to a porous body, subsequently forming a continuous dielectric oxide thin film on the surface of the porous pellet by anodizing, coating the oxide film with cathode material, and the final enveloping operation. The capacitance of the capacitor is depended on the surface area of tantalum and/or niobium powders. The higher surface area of the powder used, the higher capacitance of the capacitors may be obtained. Leakage current of the capacitor is also an important parameter in evaluating the quantity of the capacitor. As the impurities degrade the dielectric properties of the oxide film, low leakage current capacitors can be obtained by using the tantalum and/or niobium powders with high purity.

There are two kinds of methods for the production of tantalum and niobium powders in the prior art. One method is electronic beam method, in which the electronic beam melted tantalum or niobium ingot was hydrogenated and then pulverized, and the obtained powder has high purity, but with low surface area, therefore result in low capacitance of the capacitors made with these powders. The other method is chemical reduction method, in which the compound containing tantalum or niobium is reduced by reducing agent, and the obtained powder is leached with acids and water.

The typical process for producing tantalum powder is reducing potassium fluorotantalate ($K_2TaF_7$) with sodium as published in U.S. Pat. No. 3,012,877. As summarized in WO 91/18121, in order to obtain high surface area tantalum powder via chemical reduction method, a certain amount of diluent, such as alkali metal halides selected from NaCl, KCl, KF and NaF was added in the raw materials to be reduced. However, if higher surface area of the powder is required, more diluent should be used in said method for producing tantalum powder. Unfortunately, when more diluent is used, tantalum powder will be contaminated with more impurities and the yield will also be decreased. Moreover, as the surface area of the powder reaches to a certain extent, it can hardly be increased even if more diluent is used in the reduction reaction. As a result, tantalum powder obtained by reducing $K_2TaF_7$ with sodium in industry usually has a surface area of between 0.2~2.0 $m^2$/g, it is almost impossible to produce higher surface area tantalum powder by the chemical reduction method.

U.S. Pat. No. 6,136,062 disclosed a method of producing niobium and/or tantalum powders by reducing corresponding niobium and/or tantalum oxides with magnesium metal, wherein the first reduction stage is carried out as far as an average composition corresponding to (Nb, Ta) $O_x$ (x=0.5~1.5), and before the second reduction stage, the reduction product from die first stage is freed from excess reducing metals and alkaline earth metal oxides formed in the reduction by washing with mineral acids. Although this process can produce high surface area niobium and/or tantalum powders, the disadvantages are that the amount of reducing agent used is too much, that the amount of acid needed is too much. Moreover, this process includes two stages of reduction, and the degree of reduction of the first stage must be critically controlled. Therefore, the process is complicated and low efficiency.

SUMMARY OF THE INVENTION

In order to solve the problem described above, the present inventors developed an economic process of producing high surface area tantalum and/or niobium powders, in which reduction of tantalum and/or niobium oxides are carried out with an alkali metal and at least one halide selected from the group consisting of halides of Mg, Ca, Sr, Ba and Ce.

The object of the invention is to provide an economic process for the production of high surface area tantalum and/or niobium powders via the reduction of corresponding tantalum and/or niobium oxides, wherein the reduction is carried out by reacting the tantalum and/or niobium oxides with at least one metal halide and an alkali metal at elevated temperature so as to form the tantalum and/or niobium powders, said metal halide is selected from the group consisting of halides of Mg, Ca, Sr, Ba and Ce.

According to a preferred embodiment of the present invention, at least one alkali metal halide is further used in the reduction as a diluent, said alkali metal halide may be selected from sodium chloride, potassium chloride, lithium chloride, potassium fluoride, sodium fluoride.

According to an embodiment of the present invention, said process comprises charging said at least one metal halide selected from the group consisting of halides of Mg, Ca, Sr, Ba and Ce, the alkali metal, the tantalum and/or niobium oxides, and the optional at least one alkali metal halide in a reactor, heating the reactor to elevated temperature so that the tantalum and/or niobium oxides are reduced to tantalum and/or niobium powders.

According to another embodiment of the present invention, said process comprises charging said at least one metal halide selected from the group consisting of halides of Mg, Ca, Sr, Ba and Ce, and the optional alkali metal halide in a reactor, heating the reactor to elevated temperature to form a molten bath, and then metering required amount of tantalum and/or niobium oxides and alkali metal to the molten bath while controlling the temperature of the reactor so that the tantalum and/or niobium oxides are reduced to tantalum and/or niobium powders.

According to the process of the present invention, the reduction is usually carried out at a temperature in the range of 400–1200° C., preferably in the range of 600–1000° C. for about 20–300 minutes so that the reduction can be carried out completely.

According to the present invention, the said alkali metals are used as reducing agent, said alkali metals are preferably selected from sodium, potassium and lithium, sodium and/or potassium are particularly preferred. The amount of alkali metals used is 1.0 to 1.3 times of the stoichiometric amount for reducing the tantalum and/or niobium oxides. According to the present invention, the halide selected from halides of Mg, Ca, Sr, Ba and Ce is used as both a diluent and as an indirect reducing agent, wherein halides of Mg and Ca are preferred. The mole amount of said metal halides used is 0.5 to 8.0 times of the mole amount of the alkali metal used.

The tantalum and/or niobium oxides used for the present invention may be any tantalum and/or niobium oxides or their mixture which is capable of being reduced to tantalum and/or niobium metal, for example, $Ta_2O_x$ ($x \leq 5$), $Nb_2O_x$ ($x \leq 5$). They are generally available as $Ta_2O_5$ and $Nb_2O_5$.

In order to obtain high surface area tantalum and/or niobium powders as well as the sintered anodes formed from them, according to the present invention, a dopant containing N, P, S, B or Si can be further added to the above raw materials used in the reduction reaction, and/or added during the reduction reaction, and/or added after the reduction reaction.

According to the present invention, the reduction is usually carried out in a closed reactor made from refractory alloy. In order to make the reactant dispersing homogeneously in the molten salts and to prevent from local overheating, the reactor is preferably equipped with a stirrer. In addition, the reactor is preferably equipped with a heating device and a cooling device so as to control the temperature of the reactor. The said reactor as well as the stirrer, the heating device and cooling device can be any equipment that is well known to the skill in the art.

According to the process of the present invention, the reduction is carried out under the inert atmosphere, for example argon and/or nitrogen atmosphere. The reactor is maintained under inert gas until that the mass in the reaction vessel is cooled to ambient temperature.

After the reduction, the reduction product was cooled and taken out of the reactor, and crushed and then washed with mineral acid solution and de-ionized water to remove the excess alkali metals, alkali metal halides, the halides and oxides of Mg, Ca, Sr, Ba and Ce, so as to obtain the agglomerates of tantalum and/or niobium powders. Suitable mineral acid solution for washing the product is at least one of hydrochloric acid, nitric acid, sulphuric acid, hydrofluoric acid and hydrogen peroxide or mixture thereof The tantalum and/or niobium powders obtained as said above are dried with common method. The dried tantalum and/or niobium powders are screened with a 40–100 mesh sieve, the fine powders passing the sieve are subjected to chemical analysis and physical properties test.

Without being bound to a particular theory, it is believed that the reduction of the tantalum and/or niobium oxides in the present invention is carried out as:

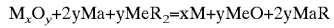

$$M_xO_y + 2yMa + yMeR_2 = xM + yMeO + 2yMaR$$

Wherein, M is Ta and or Nb; Ma is alkali metal, preferably selected from at least one of Na, K and Li; Me is selected from at least one of Mg, Ca, Sr, Ba and Ce; R are halide ions. $M_xO_y$ express the oxides of tantalum and/or niobiwn with five valences or less than five valences. So it can be regarded that the alkali metals are used as reducing agent, and the halides of Mg, Ca, Sr, Ba and Ce are used both as indirect reducing agent and as a diluent.

The tantalum and/or niobium powders produced according to the process of the present invention are comprised of porous agglomerates comprising many primary particles. The tantalum powder has a BET surface area of 1–30 m²/g, and the niobium powder has a BET surface area of 1–40 m²/g, and the primary particle size of these powder is in a range of 10–250 nm, and preferable 20–100 nm. The oxygen content of the tantalum and/or niobium powders produced by the process of the present invention is in the range of 4000–80000 ppm, and the alkali metal content is less than 20 ppm, preferable less than 5 ppm.

The tantalum and/or niobium powders produced by the process of the present invention can be subjected to further refinery operation such as doping, heat agglomeration and deoxidization. The technologies of doping, heat agglomeration and deoxidization are well known in the art. The doping can be carried out by treating tantalum and/or niobium powders produced by process of the present invention with a dopant comprising N, P, S, B or Si. The deoxidization can be carried out by heating the tantalum and/or niobium powders produced by the process of the present invention with a reducing agent such as magnesium and calcium, and optional diluent such as alkali metal halide. The heat agglomeration can be carried out in a vacuum furnace at a temperature of 700–1400° C. for a period of 10–120 minutes. The said agglomerated tantalum and/or niobium powders usually have a medium particle size (D50) of 40–300 μm, preferable 40–200 μm, and the agglomerated particles have good flowability, and are suitable to manufacture capacitors.

DETAILED DESCRIPTION OF PREFERRED EMBODIMENTS

Figure 1:
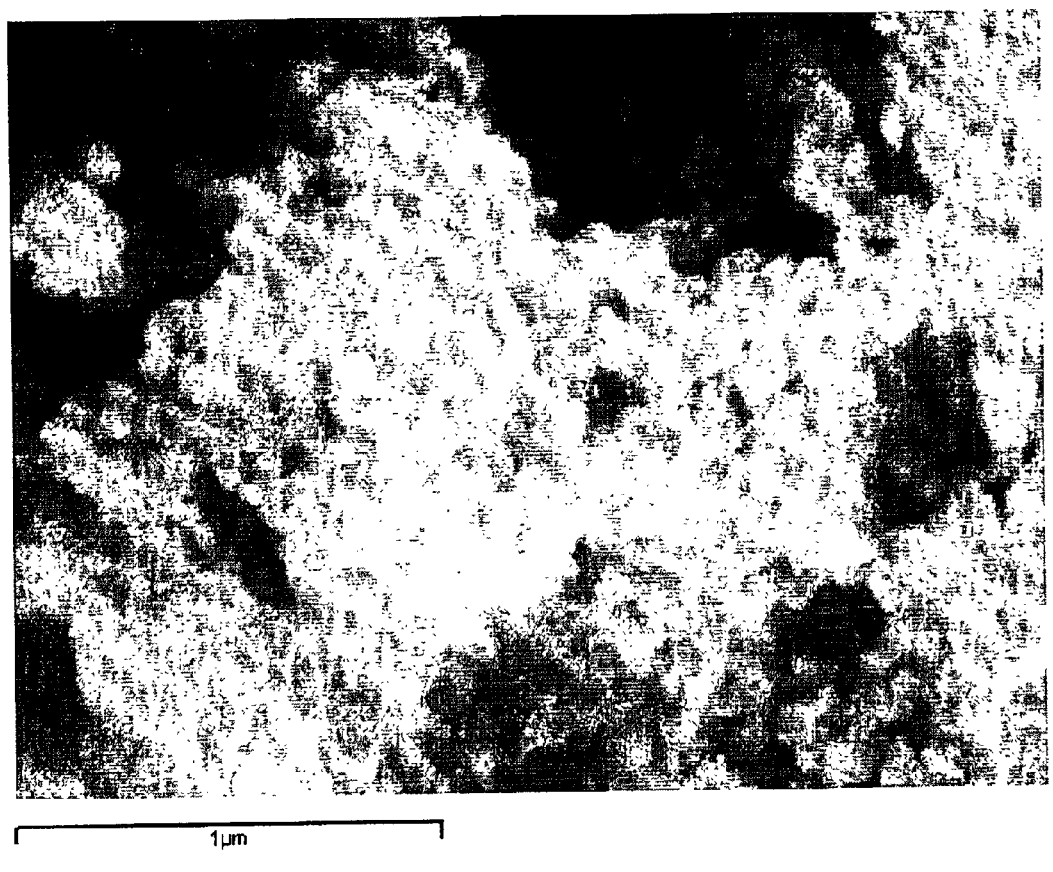
FIG. 1 is a SEM photograph (50000 magnified) of tantalum powders prepared from the example 2 of the description. It can be seen that the primary particle size of the powder is about 40–60nm.
Figure 2:
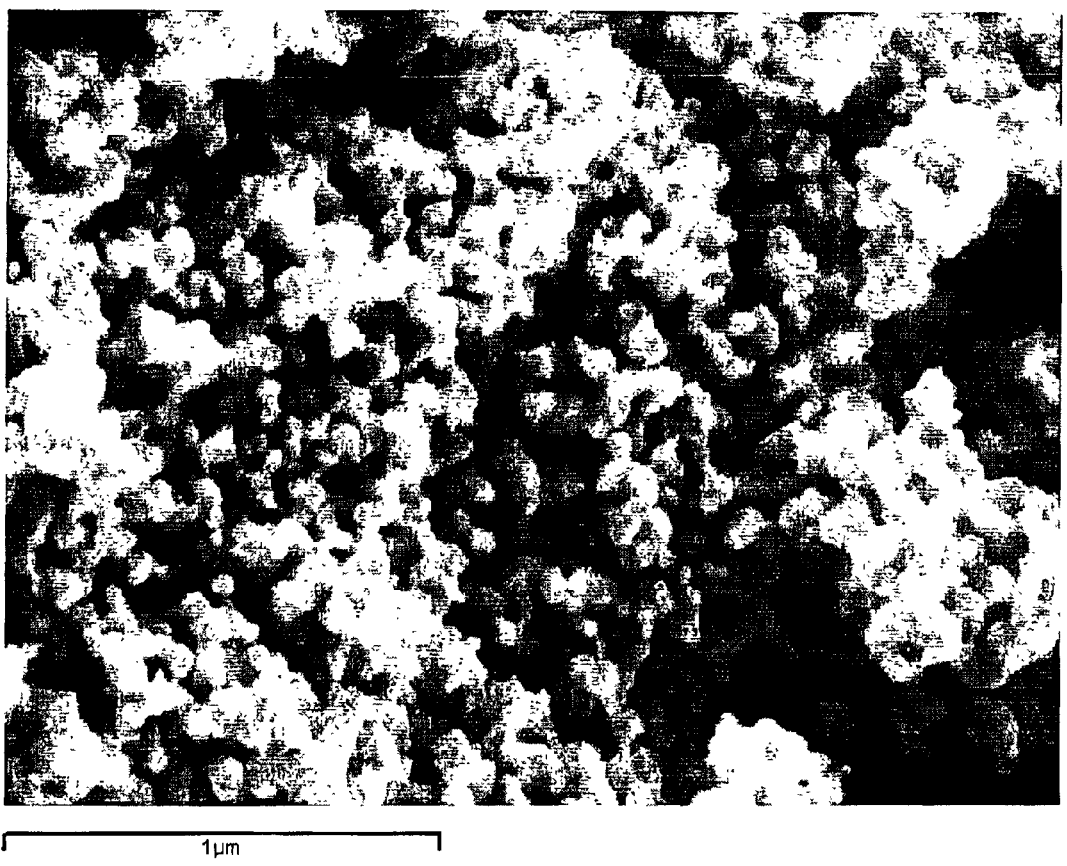
FIG. 2 is a SEM photograph (50000 magnified) of niobium powders prepared from the example 5 of the invention. It can be seen that the primary particle size of the powder is about 40–60 nm.

The present invention will be further illustrated by referring to the following examples and drawings. It should be understood that these examples are intended to illustrate the features and advantages of the present invention and are not to be considered as limiting the scope of the invention.

The data disclosed in the present specification are measured as follows: the Scott bulk density(SBD) of the powder was tested in accordance with the process of the Chinese national standard GB 5060-85, the Fisher sub-sieve size (FSSS) of the powder was tested in accordance with the process of the Chinese national standard GB 3249-82, the BET surface area of the powder was tested in accordance with the BET nitrogen absorption process with the surface area analyzer ASAP2021 made by Micromeritics Corporation, and the medium particle size (D50) of the powders as well as the distribution of the particle size of the powders were tested with LS-230 laser particle size distribution analyzer made by BECKMAN COULTER Corporation after a ultra-sonic wave vibration of 70 seconds. And the SEM photographs were taken with JSM-6301 F Field Emission Scanning Microscope.

In the specification, the flowability of the powder was tested with reference to the process of ASTM-B-213-90, and the distribution of particle size of the agglomerated particles was tested with reference to the process of ASTM-B-21486.

To test the electronic properties of the tantalum and/or niobium powders produced by the process of the present invention, first forming anode with the tantalum and/or niobium powders as follows, and then measuring the electronic properties of the anode.

For the tantalum powder, a pellet in rectangular parallelepiped shape (L 2.62mm×W 2.22mm) was pressed into the density of 4.5 to 5.6 g/cm$^3$ with 40 mg powder, subsequently sintered in a vacuum furnace at a temperature of 1200° C. for a period of 20 minutes. The sintered body was anodized in 0.1 (vol.)% $H_3PO_4$ solution at 60° C. under 16 V DC voltages to form tantalum anode. The capacitance of the anode made from the tantalum powders of the present invention is in the range of 50000~200000 μFV/g, and the leakage current of the anode is less than 5 nA/μFV.

For the niobium powder, a pellet in cylinder shape (Φ3.0mm) was pressed into the density of 2.5 to 3.0 g/cm$^3$ with 100 mg powder, subsequently sintered at a temperature of 1150° C. for a period of 20 minutes. The sintered body was anodized in 0.1 (vol.)% $H_3PO_4$ solution at 80° C. under 20 V DC voltages to form niobium anode. The capacitance of the anode made from the niobium powders of the present invention is in the range of 60000~300000 μFV/g, and the leakage current of the anode is less than 5 nA/μFV.

EXAMPLE 1

First step (reduction of tantalum oxide): 4 kilograms of $Ta_2O_5$, 6 kilograms of $MgCl_2$, 6 kilograms of KCl and 3 kilograms of NaCl were homogeneously mixed to form a mixture. A crucible charged with the said mixture and additional 1 kilogram of sodium was put in a closed reaction vessel. The closed reaction vessel was then evacuated, subsequently filled with argon, and then heated by electrical resistance heating elements to 800° C. and held for a period of 30 minutes, the temperature of the reaction vessel was subsequently risen to 900° C. and held for a period of 30 minutes.

Second step (recovery of tantalum powder): When the reaction products obtained from the said first step were allowed to cool to ambient temperature, the tantalum powder produced was discharged out of the crucible, crushed, washed with de-ionized water to remove the soluble salts and alkali metals, leached with a hydrochloric acid solution, then washed with de-ionized water until the water reached neutral pH value. The recovered tantalum powder was dried, screened with a 100 Mesh sieve, and 2953 grams of tantalum powder (crude powder) were obtained, the yield of tantalum was 90.15%. The Scott bulk density, the particle size (FSSS), BET surface area and medium particle size of the powder were tested and listed as follows:

| Scott bulk density | 1.4 g/cm$^3$ |
| --- | --- |
| particle size (FSSS) | 0.3 μm |
| BET surface area | 7.2 m$^2$/g |
| medium particle size | 2.1 μm |

The tantalum powder was subject to chemical analysis, wherein the contents of O, C, Fe, Ni, Cr are as follows:

| O | 19000 ppm |
| --- | --- |
| C | 120 ppm |
| Fe | 15 ppm |
| Ni | 5 ppm |
| Cr | 5 ppm |

Third step(agglomeration of tantalum powder): The crude powder obtained by the second step was doped with phosphorus, heat-treated in a vacuum furnace under a pressure of less than 5.0×10$^{-1}$ Pa by conventional method, the cooled powders were unloaded from the furnace, crushed and screened with a 40 mesh sieve. And the agglomerated tantalum powder was obtained.

Fourth step(deoxidization of tantalum powder): The tantalum powder obtained from the third step was added with magnesium powder and heated to 850° C. and held for a period of 1 hour, and then cooled to ambient temperature, unloaded, leached with a hydrochloric acid solution, then washed with de-ionized water until the water reached neutral pH value, and further dried and screened with 40 mesh sieve.

The physical properties of the tantalum powder obtained above are as follows:

| Scott bulk density | 2.2 g/cm$^3$ |
| --- | --- |
| particle size (FSSS) | 1.95 μm |
| BET surface area | 2.8 m$^2$/g |
| medium particle size | 140 μm |

The mesh analysis of the powders is listed in Table 1:

TABLE 1

| The mesh analysis of the tantalum powder | | | | | |
| --- | --- | --- | --- | --- | --- |
| Particle size | −40/+80 mesh | −80/+200 mesh | −200/+325 mesh | −325/+400 mesh | −400 mesh |
| % | 1.2 | 64.1 | 18.5 | 10.0 | 6.2 |

Flowability of tantalum powder: 7 Second/50 g

The tantalum powder was subject to chemical analysis, wherein the contents of O, C, N, Fe, Ni, Cr, Si, K, Na, Ca, Mg are as follows:

| O | 5400 ppm |
| --- | --- |
| C | 100 ppm |
| N | 1200 ppm |
| Fe | 17 ppm |
| Ni | 5 ppm |
| Cr | 5 ppm |
| K | 3 ppm |
| Na | 3 ppm |
| Ca | 5 ppm |
| Mg | 20 ppm |

The electrical properties of the anode made from the powder, such as capacitance, leakage current are listed in the Table 6.

EXAMPLE 2

First step (reduction of tantalum oxide): 10 kilograms of $Ta_2O_5$, 15 kilograms of $CaCl_2$, 22 kilograms of KCl, 10 kilograms of NaCl were charged in a retort equipped with a stirrer. The closed reaction retort and its charge was evacuated, subsequently filled with argon, and then heated by electrical resistance heating elements to a temperature of 850° C. to form a molten bath. 5250 grams of sodium was injected into the molten bath at a rate of approximate 640 grams of Na/minute while cooling the retort so as to maintain the temperature of the retort at about 850° C. Then the temperature of the retort was risen to 900° C. and held for a period of 60 minutes so that the tantalum oxide was completely reduced to tantalum powder.

Second step (recovery of tantalum powder): When the reaction products obtained from the said first step were allowed to cool to ambient temperature, the tantalum metal powder produced was discharged out of the retort, crushed, washed with de-ionized water, leached with a hydrochloric acid solution, then washed with de-ionized water until the water reached neutral pH value. The tantalum powder was dried, screened with an 80 Mesh sieve. 7470 grams of the tantalum powder (crude powder) were obtained, the yield of tantalum was 91.2%. The Scott bulk density, the particle size (FSSS), BET surface area and medium particle size of the powder were tested and listed as follows:

| Scott bulk density | 0.56 g/cm$^3$ |
|---|---|
| particle size (FSS) | 0.14 μm |
| BET surface area | 9.72 m$^2$/g |
| medium particle size | 6.7 μm |

The tantalum powder was subjected to chemical analysis, wherein the contents of O, C, Fe, Ni, Cr are as follows:

| O | 37000 ppm |
|---|---|
| C | 110 ppm |
| Fe | 25 ppm |
| Ni | 55 ppm |
| Cr | 5 ppm |

Third step (agglomeration of tantalum powder): The crude powder obtained by the said second step was doped with phosphorus, heat-treated in a vacuum furnace under a pressure of less than $5.0 \times 10^{-1}$ Pa by conventional method, the cooled powder was unloaded and screened with a 40 mesh sieve. The agglomerated tantalum powder was obtained.

Fourth step (deoxidization of tantalum powder): the tantalum powder obtained by the third step was added with magnesium powder and heated to a temperature of 800° C. and held for a period of 1 hour, and then cooled to ambient temperature, leached with a hydrochloric acid solution, then washed with de-ionized water until the water reached neutral pH value, and further dried and screened with a 40 mesh sieve.

The physical properties of the tantalum powder obtained above are as follows:

| Scott bulk density | 1.7 g/cm$^3$ |
|---|---|
| particle size (FSSS) | 0.5 μm |
| BET surface area | 3.8 m$^2$/g |
| medium particle size | 100 μm |

The mesh analysis of the tantalum powder is listed in the Table 2:

TABLE 2

| The mesh analysis of the tantalum powder | | | | | |
|---|---|---|---|---|---|
| Particle | −40/+80 | −80/+200 | −200/+325 | −325/+400 | −400 |
| size | mesh | mesh | mesh | mesh | mesh |
| % | 2.2 | 61.1 | 20.1 | 10.5 | 6.1 |

Flowability of the tantalum powder: 12 second/50 g

The tantalum powder was subjected to chemical analysis, wherein the contents of O, C, N, Fe, Ni, Cr, Si, K, Na, Ca, Mg are as follows:

| O | 10500 ppm |
|---|---|
| C | 100 ppm |
| N | 1200 ppm |
| Fe | 24 ppm |
| Ni | 60 ppm |
| Cr | 5 ppm |
| K | 3 ppm |
| Na | 3 ppm |
| Ca | 30 ppm |
| Mg | 12 ppm |

The electrical properties of the anode made from the powder such as capacitance, leakage current are listed in the Table 6.

EXAMPLE 3

First step (reduction of tantalum oxide): 10 kilograms of Ta$_2$O$_5$, 15 kilograms of CaCl$_2$, 22 kilograms of KCl, 10 kilograms of NaCl were charged in a retort equipped with a stirrer. The closed reaction retort and its charge were evacuated, subsequently filled with argon, and then heated by electrical resistance heating elements to 1050° C. so as to form a molten bath, the bath was stirred to make Ta$_2$O$_5$ dispersing homogeneously in the bath. 5510 grams of sodium was injected into the molten bath at a rate of approximate 1020 grams of Na/minute while cooling the retort so as to maintain the temperature of the retort at about 1050° C. The temperature of the retort was held at 1050° C. for a period of 20 minutes so that the tantalum oxide was completely reduced to tantalum powder.

Second step (recovery of tantalum powder): When the reaction products obtained from the said first step were allowed to cool to ambient temperature, the tantalum metal powder produced was discharged out of the retort, crushed, washed with de-ionized water, leached with a hydrochloric acid solution, then washed with de-ionized water until the water reached neutral pH value. The tantalum powder was dried, screened with an 80 Mesh sieve. 7510 grams of the tantalum powder (crude powder) were obtained, the yield of tantalum was 91.8%. The Scott bulk density, the particle size (FSSS), BET surface area and medium particle size of the powder were tested and listed as follows:

| Scott bulk density | 0.63 g/cm$^3$ |
|---|---|
| particle size (FSSS) | 0.28 μm |
| BET surface area | 7.68 m$^2$/g |
| medium particle size | 8.6 μm |

The tantalum powder was subjected to chemical analysis, wherein the contents of O, C, Fe, Ni, Cr are as follows:

| O | 21000 ppm |
|---|---|
| C | 80 ppm |
| Fe | 25 ppm |
| Ni | 65 ppm |
| Cr | 10 ppm |

Third step (agglomeration of tantalum powder): The crude powder obtained by the said second step was doped with phosphorus, heat-treated in a vacuum furnace under a pressure of less than $5.0 \times 10^{-1}$ Pa by conventional method, the cooled powder was unloaded and screened with a 40 mesh sieve. The agglomerated tantalum powder was obtained.

Fourth step(deoxidization of tantalum powder): the tantalum powder obtained by the third step was added with magnesium powder and heated to a temperature of 860° C. and held for a period of 1 hour, and then cooled to ambient temperature, leached with a nitric acid solution, then washed with de-ionized water until the water reached neutral pH value, and further dried at 80° C. and screened with a 40 mesh sieve.

The physical properties of the tantalum powder obtained above are as follows:

| | |
|---|---|
| Scott bulk density | 1.75 g/cm³ |
| particle size (FSSS) | 2.5 μm |
| BET surface area | 2.1 m²/g |
| medium particle size | 120 μm |

The mesh analysis of the tantalum powder is listed in the Table 3:

TABLE 3

The mesh analysis of the powder

| Particle size | −40/+80 mesh | −80/+200 mesh | −200/+325 mesh | −325/+400 mesh | −400 mesh |
|---|---|---|---|---|---|
| % | 2.0 | 49.1 | 19.2 | 18.6 | 11.1 |

Flowability of tantalum powder: 9 second/50 g

The tantalum powder was subjected to chemical analysis, wherein the contents of O, C, N, Fe, Ni, Cr, Si, K, Na, Ca, Mg are as follows:

| | |
|---|---|
| O | 6600 ppm |
| C | 80 ppm |
| N | 1000 ppm |
| Fe | 20 ppm |
| Ni | 60 ppm |
| Cr | 5 ppm |
| K | 5 ppm |
| Na | 3 ppm |
| Ca | 20 ppm |
| Mg | 10 ppm |

The electrical properties of the anode made from the powder such as capacitance, leakage current are listed in the Table 6.

EXAMPLE 4

First step (reduction of niobium oxide): 30 kilograms of $CaCl_2$, 1 kilogram of KCl, 15 kilograms of NaCl were charged in a retort equipped with a stirrer. The closed reaction retort and its charge was evacuated, subsequently filled with argon, and then heated by electrical resistance heating elements to 500° C., 9650 grams of liquid sodium metal were injected into the retort, after the $CaCl_2$, KCl, NaCl were melted to form a bath, the bath was stirred. 10 kilograms of niobium oxide ($Nb_2O_5$) was metered into the molten bath at a rate of approximate 850 grams/minute while cooling the retort so as to maintain the temperature of the retort at about 480° C. Then the temperature was risen to 750° C. and held for a period of 60 minutes so that the niobium oxide was completely reduced to niobium powder.

Second step (recovery of niobium powder): When the reaction products obtained from the said first step were allowed to cool to ambient temperature, the niobium metal powder produced was discharged out of the retort, crushed, washed with de-ionized water, leached with a hydrochloric acid solution, then washed with de-ionized water until the water reached neutral pH value. The niobium powder was further dried and screened with an 80 Mesh sieve. 6300 grams of the niobium powder (crude powder) were obtained, the yield of tantalum was 90.2%. The Scott bulk density, the particle size (FSSS), BET surface area and medium particle size of the powder were tested and listed as follows:

| | |
|---|---|
| Scott bulk density | 0.54 g/cm³ |
| particle size (FSSS) | 0.13 μm |
| BET surface area | 26.72 m²/g |
| medium particle size | 5.7 μm |

The niobium powder was subjected to chemical analysis, wherein the contents of O, C, Fe, Ni, Cr are as follows:

| | |
|---|---|
| O | 67000 ppm |
| C | 90 ppm |
| Fe | 25 ppm |
| Ni | 60 ppm |
| Cr | 5 ppm |

EXAMPLE 5

First step (reduction of niobium oxide): 4 kilograms of $Nb_2O_5$, 10 kilograms of $CaCl_2$, 10 kilograms of KCl, 8 kilograms of NaCl were charged in a retort equipped with a stirrer. The closed reaction retort and its charge was evacuated, subsequently filled with argon, and then heated by electrical resistance heating elements to a temperature of 780° C. After the $CaCl_2$, KCl, NaCl were melted to form a molten bath, the bath was stirred to make $Nb_2O_5$ dispersing homogeneously in the molten bath. 3.5 kilograms of sodium was injected into the molten bath at a rate of approximate 520 grams/minute while cooling the retort so as to maintain the temperature of the retort at about 780° C. Then the temperature was risen to 860DC and held for a period of 30 minutes so that the niobium oxide was completely reduced to niobium powder.

Second step (recovery of niobium powder): When the reaction products obtained from the said first step were allowed to cool to ambient temperature, the niobium metal powder produced was discharged out of the retort, crushed, washed with de-ionized water, leached with a hydrochloric acid solution, then washed with de-ionized water until the water reached neutral pH value. The niobium powder was further dried, screened with an 80 Mesh sieve. 2718 grains of the niobium powder (crude powder) were obtained. The Scott bulk density, the particle size (FSSS), BET surface area and medium particle size of the powder were tested and listed as follows:

| | |
|---|---|
| Scott bulk density | 0.46 g/cm³ |
| particle size (FSSS) | 0.45 μm |
| BET surface area | 24.5 m²/g |
| mid-diameter size | 5.8 μm |

The niobium powders were subjected to chemical analysis, wherein the contents of O, C, Fe, Ni, Cr are as follows;

| | |
|---|---|
| O | 6.5% |
| C | 90 ppm |
| Fe | 50 ppm |
| Ni | <50 ppm |
| Cr | <50 ppm |

Third step (deoxidization of niobium powder): 2000 grams of crude powder obtained by the second step were doped with phosphorus, added with magnesium, mixed with 3 kilograms of KCl, heated to 840° C. and held for 1 hour in an inert atmosphere containing argon and nitrogen gases, after the powder was cooled to ambient temperature, it was unloaded and leached with a hydrochloric acid and washed with de-ionized water until the water reached neutral pH value, and further dried and screened with a 40 mesh sieve. The deoxidized niobium powder was obtained.

The physical properties are as follows:

| | |
|---|---|
| Scott bulk density | 1.1 g/cm$^3$ |
| particle size (FSSS) | 2.5 μm |
| BET surface area | 5.6 m$^2$/g |
| medium particle size | 100 μm |

The mesh analysis of the powder is listed in the Table 4:

TABLE 4

The mesh analysis of the powder

| Particle size | −40/+80 mesh | −80/+200 mesh | −200/+325 mesh | −325/+400 mesh | −400 mesh |
|---|---|---|---|---|---|
| % | 5.2 | 51.4 | 18.9 | 10.6 | 13.9 |

Flowability of the niobium powder: 17 second/50 g

The niobium powder was subjected to chemical analysis, wherein the contents of O, C, N, Fe, Ni, Cr, Si, K, Na, Ca, Mg are as follows:

| | |
|---|---|
| O | 11000 ppm |
| C | 130 ppm |
| N | 7300 ppm |
| Fe | 60 ppm |
| Ni | <50 ppm |
| Cr | <50 ppm |
| K | 15 ppm |
| Na | 18 ppm |
| Ca | 80 ppm |
| Mg | 14 ppm |

The electrical properties of the anode made from the powder such as capacitance, leakage current are listed in the Table 7.

EXAMPLE 6

First step (Reduction of niobium oxide): 3 kilograms of Nb$_2$O$_5$, 12 kilograms of CaCl$_2$ were charged in a retort equipped with a stirrer. The closed reaction retort and its charge was evacuated, subsequently filled with argon, and then heated by electrical resistance heating elements to 860° C. After the CaCl$_2$ was melted, stirred the bath so that the Nb$_2$O$_5$ was dispersed homogeneously in the molten bath. 2.9 kilograms of sodium was injected into the molten bath at a rate of approximate 680 grams/minute while cooling the retort so as to maintain the temperature of the retort at about 860° C. The retort was held at 860° C. for a period of 30 minutes so that the niobium oxide was completely reduced to niobium powder.

Second step (recovery of niobium powder): When the reaction products obtained from the said first step were allowed to cool to ambient temperature, the niobium metal powder produced was discharged out of the retort, crushed, washed with de-ionized water, leached with a hydrochloric acid solution, then washed with de-ionized water until the water reached neutral pH value. The niobium powder was further dried, screened with an 80 Mesh sieve. 1901 grams of the niobium powder (crude powder) were obtained. The Scott bulk density, the particle size (FSSS), BET surface area and medium particle size of the powders were tested and listed as follows:

| | |
|---|---|
| Scott bulk density | 0.48 g/cm$^3$ |
| particle size (FSSS) | 0.49 μm |
| BET surface area | 21.5 m$^2$/g |
| medium particle size | 6.8 μm |

The niobium powder was subjected to chemical analysis, wherein the contents of O, C, Fe, Ni, Cr are as follows:

| | |
|---|---|
| O | 9.0% |
| C | 100 ppm |
| Fe | 50 ppm |
| Ni | <50 ppm |
| Cr | <50 ppm |

Third step(deoxidization of niobium powder): 2000 grams of crude powder obtained by the said second step were doped with phosphorus, added with magnesium, mixed with 2 kilograms of KCl, and heated to 840° C. and held for a period of 1 hour in an atmosphere containing argon and nitrogen gases. After being cooled to ambient temperature, the niobium powder was unloaded from the retort and leached with a hydrochloric acid solution and washed with de-ionized water until the water reached to neutral, and further dried and screened with a 40 mesh sieve. The deoxidized niobium powder was obtained. The physical properties are as follows:

| | |
|---|---|
| Scott bulk density | 1.2 g/cm$^3$ |
| particle size (FSSS) | 2.6 μm |
| BET surface area | 4.9 m$^2$/g |
| mid-diameter size | 120 μm |

The mesh analysis of the powder is listed in the Table 5:

TABLE 5

The mesh analysis of the powder of sample 6

| Particle size | −40/+80 mesh | −80/+200 mesh | −200/+325 mesh | −325/+400 mesh | −400 mesh |
|---|---|---|---|---|---|
| % | 5.5 | 51.0 | 20.1 | 10.4 | 13.0 |

Flowability of the niobium powder: 16 second/50 g

The niobium powder was subjected to chemical analysis, wherein the contents of O, C, N, Fe, Ni, Cr, Si, K, Na, Ca, Mg are as follows:

| | |
|---|---|
| O | 10000 ppm |
| C | 130 ppm |
| N | 900 ppm |
| Fe | 60 ppm |
| Ni | <50 ppm |
| Cr | <50 ppm |
| K | 11 ppm |
| Na | 10 ppm |
| Ca | 80 ppm |
| Mg | 25 ppm |

The electrical properties of the anode made from the powder such as capacitance, leakage current are listed in the Table 7.

TABLE 6

Electrical properties of Ta powders
(sintered at 1200° C./20 min.; 0.1 (vol.) % $H_3PO_4$, 60° C.)

| sample | DC L nA/CV | CV µFV/g | tg δ % | Green density g/cc | Sintered density g/cc |
|---|---|---|---|---|---|
| example 1 | 0.95 | 112580 | 67.4 | 5.60 | 5.95 |
| example 2 | 1.51 | 155800 | 72.6 | 4.75 | 5.16 |
| example 3 | 0.45 | 102300 | 50.2 | 5.60 | 5.80 |

TABLE 7

Electrical properties of Nb powders
(sintered at 1150° C./20 min., 0.5 (vol.) % $H_3PO_4$, 60° C.)

| sample | DC L nA/CV | CV µFV/g | tg δ % | Green density g/cc | Sintered density g/cc |
|---|---|---|---|---|---|
| example 5 | 1.30 | 135000 | 70.3 | 2.50 | 2.61 |
| example 6 | 1.41 | 126500 | 85.1 | 2.50 | 2.7 |

As described above, the advantages of the present invention lie in that: the combination of the high surface area and high purity tantalum and/or niobium powders can be produced in high yield, the agglomerated powders have good flowability, the anode made from these powders are characterized by high capacitance and low DC leakage current.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A process for the production of high surface area tantalum and/or niobium powders via the reduction of corresponding tantalum and/or niobium oxides, wherein the reduction is carried out by reacting the tantalum and/or niobium oxides with at least one metal halide and an alkali metal at elevated temperature so as to form the tantalum and/or niobium powders, said metal halide is selected from the group consisting of halides of Mg, Ca, Sr, Ba and Ce.

2. The process according to claim 1, wherein the process comprises charging the metal halide, the alkali metal, and the tantalum and/or niobium oxides in a reactor, heating the reactor to sufficiently high temperature so that the tantalum and/or niobium oxides are reduced to tantalum and/or niobium powders.

3. The process according to claim 1, wherein the process comprises charging the metal halide in a reactor, heating the reactor to elevated temperature to form a molten bath, and then metering required amount of tantalum and/or niobium oxides and alkali metal to the molten bath while controlling the temperature of the reactor so that the tantalum and/or niobium oxides are reduced to tantalum and/or niobium powders.

4. The process according to claim 1, wherein said elevated temperature of reduction is in the range of 400–1200° C., preferably 600–1000° C.

5. The process according to claim 1, wherein said alkali metal is sodium or potassium and, the amount of alkali metal used is 1.0 to 1.3 times the stoichiometric amount for reducing the tantalum and/or niobium oxides.

6. The process according to claim 5, wherein the mole amount of the metal halide used is 0.5 to 8.0 times of the mole amount the alkali metal used.

7. The process according to claim 1, wherein the tantalum oxide is selected from oxides of tantalum with a valence of five or less, said niobium oxide is selected from oxides of niobium with a valence of five or less.

8. The process according to claim 1, wherein at least one alkali metal halide is further used as a diluent in the reduction reaction.

9. The process according to claim 8, wherein said process comprises charging said at least one metal halide selected from the group consisting of halides of Mg, Ca, Sr, Ba and Ce, the alkali metal, the tantalum and/or niobium oxides, and the at least one further alkali metal halide in a reactor, and heating the reactor to an elevated temperature so that the tantalum and/or niobium oxides are reduced to tantalum and/or niobium powders.

10. The process according to claim 8, wherein said process comprises charging said at least one metal halide selected from the group consisting of halides of Mg, Ca, Sr, Ba and Ce, and the further alkali metal halide in a reactor, heating the reactor to sufficiently high temperature to form a molten bath, and then metering required amount of tantalum and/or niobium oxides and the alkali metal to the molten bath while controlling the temperature of the reactor so that the tantalum and/or niobium oxides are reduced to tantalum and/or niobium powders.

11. The process according to claim 8, wherein the elevated temperature of reduction is in the range of 400–1 200° C., preferably 600–1000° C.

12. The process according to claim 8, wherein said alkali metal is sodium or potassium and, the amount of alkali metals used is 1.0 to 1.3 times the stoichiometric amount for reducing the tantalum and/or niobium oxides.

13. The process according to claim 12, wherein the mole amount of the metal halide selected from the group consisting of halides of Mg, Ca, Sr, Ba and Ce is 0.5 to 8.0 times the mole amount of the alkali metal used.

14. The process according to claim 8, wherein said tantalum oxide is selected from oxides of tantalum with a valence of five or less, said niobium oxide is selected from oxides of niobium with a valence of five or less.

15. The process according to claim 8, further comprising adding a dopant containing N, P, S, B or Si is further to the above raw materials used for the reduction reaction, and/or during the reduction reaction, and/or after the reduction reaction.

16. The process according to claim 1, further comprising adding a dopant containing N, P, S, B or Si is to the above raw materials used in the reduction reaction, and/or during the reduction reaction, and/or after the reduction reaction.

* * * * *